United States Patent Office 3,828,080
Patented Aug. 6, 1974

---

3,828,080
ANDROSTANE - 17β - CARBOXYLIC ACIDS AND PROCESSES FOR THE PREPARATION THEREOF
Gordon Hanley Phillipps, Wembley, and Peter John May, North Harrow, England, assignors to Glaxo Laboratories Limited, Greenford, Middlesex, England
No Drawing. Filed Jan. 20, 1972, Ser. No. 219,574
Int. Cl. C07c 169/52
U.S. Cl. 260—397.1                          23 Claims

ABSTRACT OF THE DISCLOSURE

The specification describes new androstane compounds having anti-inflammatory activity. The new androstanes described in the specification have an esterified 17β-carboxylic acid grouping wherein the alcohol residue comprises a lower alkyl group; a lower alkyl group substituted by either at least one halogen atom or a lower alkoxy-carbonyl group; or a ($C_{2-4}$) lower alkyl group substituted by a lower acyloxy group. The 17α-grouping of these androstanes is an esterified hydroxy group comprising a formyl, $C_{2-4}$ alkanoyl or benzoyl group.

---

This invention is concerned with steroid compounds having anti-inflammatory properties.

Since the discovery of cortisone, a wide variety of compounds of analogous structure have been prepared having anti-inflammatory properties, such compounds being generally members of the pregnane series.

Anti-inflammatory steroids have found wide use in medicine and in latter years considerable attention has been directed to compounds having high anti-inflammatory action on topical administration.

Anto-inflammatory steroids of the pregnane series so far described, being generally analogous to cortisone, tend to a greater or lesser extent to exert the physiological action of the natural hormone and thus possess, in addition to anti-inflammatory action other actions similar to cortisone-like compounds. The physiological effects of the pregnane-type anti-inflammatory steroids may be broadly classified as glucocorticoid and mineralocorticoid effects, anti-inflammatory action at least until recently having been regarded as a glucocorticoid action. Glucocorticoid effects also include general disturbance of the body metabolism and may be very undesirable. Mineralocorticoid effects involve disturbance of the salt and water balance within the body and compounds having marked mineralocorticoid action are thus likely to produce undesirable effects on administration.

Even in the topical application of anti-inflammatory steroids, there is a risk that the steroid may be absorbed into the system through the skin, with subsequent development of undesired side effects.

There is thus a general desire to have available an anti-inflammatory steroid with high anti-inflammatory action but with which the undesired effects, either mineralocorticoid or glucocorticoid in nature, are reduced.

We have now found that certain new steroids of the androstane series, possess marked anti-inflammatory action. Moreover our researches indicate that generally the ratio of anti-inflammatory action to undesired cortisone-like action in our new compounds is generally good.

The steroid compounds with which the invention is concerned are compounds of the general formula

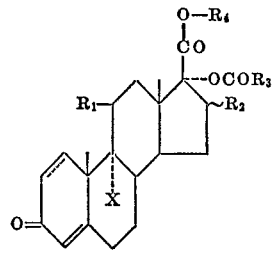

I wherein (a) X represents a hydrogen, chlorine or fluorine atom; $R_1$ represents a hydroxy group in the β-configuration or (when X represents a chlorine atom) $R_1$ may also represent a chlorine atom in the β-configuration; $R_2$ represents a hydrogen atom, a methylene group or a methyl group (in either the α- or β-configuration); $R_3$ represents a hydrogen atom, an alkyl group containing 1 to 3 carbon atoms or a phenyl group; $R_4$ represents a lower alkyl group; a lower alkyl group substituted by either at least one halogen atom or a lower alkoxy carbonyl group; or a ($C_{2-4}$) lower alkyl group substituted by a lower acyloxy group; and = represents a single or double bond; or (b) X represents a chlorine or fluorine atom; $R_1$ represents an oxo group; $R_2$ represents a hydrogen atom, a methylene group or a methyl group (in either the α- or β-configuration); $R_3$ represents a methyl or ethyl group; $R_4$ represents a lower alkyl group; a lower alkyl group substituted by either at least one halogen atom or a lower alkoxycarbonyl group; or a ($C_{2-4}$) lower alkyl group substituted by a lower acyloxy group; and = represents a single or double bond.

The new androstane compounds have anti-inflammatory action on topical and internal administration, the anti-inflammatory activity of the compounds on topical administration being generally high.

In general, the group $R_3$ in formula I is preferably an alkyl group containing up to 3 carbon atoms, i.e. a methyl, ethyl, n-propyl or iso-propyl group. In compounds wherein $R_3$ represents a hydrogen atom $R_4$ preferably represents a methyl group.

The group $R_4$ in formula I is preferably an alkyl group containing 1 to 4 carbon atoms, advantageously a methyl, ethyl or propyl group.

In regard to the possible substituents of the lower alkyl group, the halogen atom is preferably a fluorine, chlorine or bromine atom, the lower (e.g. $C_{2-5}$) acyloxy group is preferably an acetoxy group and the alkoxycarbonyl group (wherein the alkoxy group advantageously contains 1 to 4 carbon atoms) is advantageously a methoxycarbonyl group.

Generally compounds of formula I in which $R_1$ represents a β-hydroxy group are preferred. Also in general terms, compounds of formula I in which $R_2$ represents a methyl group in the β-configuration are preferred on account of their high topical anti-inflammatory activity.

A preferred class of compounds of formula I having particularly good topical anti-inflammatory activity with a favourable ratio of topical anti-inflammatory activity to glucocorticoid activity are those compound wherein X represents a chlorine or fluorine atom preferably a fluorine atom), $R_1$ represents a β-hydroxy group, $R_2$ represents a methyl group (preferably in the $\beta$-configuration), $R_3$ represents a methyl, ethyl or n-propyl group, $R_4$ represents a methyl group and $=$ represents a double bond. A further preferred class of compounds of formula I also having good topical anti-inflammatory activity with a favourable ratio of topical anti-inflammatory activity to glucocorticoid activity are those wherein X represents a fluorine or chlorine atom (preferably a fluorine atom), $R_1$ represents a keto group, $R_2$ represents a methyl group in the $\beta$-configuration, $R_3$ represents a methyl or ethyl group, $R_4$ represents a methyl group and $=$ represents a double bond.

Yet another preferred class of compounds of formula I having high topical anti-inflammatory activity are those wherein X represents a fluorine or chlorine atom (preferably a fluorine atom), $R_1$ represents a $\beta$-hydroxy group, $R_2$ represents a methylene group, $R_3$ represents a methyl, ethyl n-propyl or iso-propyl group, $R_4$ represents a methyl or ethyl group (preferably a methyl group) and $=$ preferably represents a double bond.

A preferred class of $\Delta^4$ compounds of formula I (i.e. compounds wherein $=$ represents a single bond) having especially good topical anti-inflammatory activity and ratio of topical anti-inflammatory activity to glucocorticoid activity are those wherein X represents a fluorine or chlorine atom (preferably a fluorine atom), $R_1$ represents a $\beta$-hydroxy group, $R_2$ represents a methyl group (preferably in the $\beta$-configuration), $R_3$ represents a methyl, ethyl or n-propyl group and $R_4$ represents a methyl or ethyl group (preferably a methyl group).

A still further class of compounds of formula I having good topical anti-inflammatory activity are those wherein X represents a hydrogen atom, $R_1$ represents a $\beta$-hydroxy group and $R_2$ preferably represents a hydrogen atom or a methyl group (especially in the $\beta$-configuration) $R_3$ preferably represents an alkyl group containing, 1,2 or 3 carbon atoms, $R_4$ preferably represents a lower alkyl group (e.g. a methyl group) and $=$ preferably represents a double bond. Indeed, those compounds of this class wherein $R_2$ represents a methyl group in the $\beta$-configuration have been found to possess especially high topical anti-inflammatory activity.

Yet another class of compounds of formula I having good topical anti-inflammatory activity and a good ratio of topical anti-inflammatory activity to glucocorticoid activity are those wherein X and $R_1$ represent chlorine atoms, $R_2$ represents a methyl group preferably in the $\alpha$-configuration, $R_3$ represents a methyl or ethyl group, $R_4$ represents a methyl or ethyl group and $=$ preferably represents a double bond.

Individual preferred androstanes which have been found to have especially good topical anti-inflammatory activity with generally low levels of glucocorticoid activity include:

methyl 17$\alpha$-acetoxy-9$\alpha$-fluoro-11$\beta$-hydroxy-16$\beta$-methyl-3-oxo-androsta-1,4-diene-17$\beta$-carboxylate methyl 9$\alpha$-fluoro-11$\beta$-hydroxy-16$\beta$-methyl-3-oxo-17$\alpha$-propionyloxy-androsta-1,4-diene-17$\beta$-carboxylate methyl 17$\alpha$-butyryloxy-9$\alpha$-fluoro-11$\beta$-hydroxy-16$\beta$-methyl-3-oxoandrosta-1,4-diene-17$\beta$-carboxylate methyl 17$\alpha$-acetoxy-9$\alpha$-fluoro-11$\beta$-hydroxy-16$\alpha$-methyl 3-oxoandrosta-1,4-diene-17$\beta$-carboxylate methyl 9$\alpha$-fluoro-11$\beta$-hydroxy-16$\alpha$-methyl-3-oxo-17$\alpha$-propionyloxyandrosta-1,4-diene-17$\beta$-carboxylate methyl 17$\alpha$-butyryloxy-9$\alpha$-fluoro-11$\beta$-hydroxy-16$\alpha$-methyl-3-oxoandrosta-1,4-diene-17$\beta$-carboxylate methyl 9$\alpha$-fluoro-11$\beta$-hydroxy-16-methylene-3-oxo-17$\alpha$-propionyloxyandrosta-1,4-diene-17$\beta$-carboxylate methyl 9$\alpha$-fluoro-11$\beta$-hydroxy-16$\beta$-methyl-3-oxo-17$\alpha$-propionyloxyandrost-4-ene-17$\beta$-carboxylate methyl 17$\alpha$-acetoxy-9$\alpha$-fluoro-16$\beta$-methyl-3,11-dioxoandrosta-1,4-diene-17$\beta$-carboxylate ethyl 9$\alpha$-fluoro-11$\beta$-hydroxy-16$\beta$-methyl-3-oxo-17$\alpha$-propionyloxyandrosta-1,4-diene-17$\beta$-carboxylate methyl 17$\alpha$-acetoxy-9$\alpha$,11$\beta$-dichloro-16$\alpha$-methyl-3-oxo-androsta-1,4-diene-17$\beta$-carboxylate methyl 9$\alpha$-fluoro-11$\beta$-hydroxy-17$\alpha$-isobutyryloxy-16-methylene-3-oxo-androsta-1,4-diene-17$\beta$-carboxylate ethyl 9$\alpha$-fluoro-11$\beta$-hydroxy-17$\alpha$-isobutyryloxy-16-methylene-3-oxo-androsta-1,4-diene-17$\beta$-carboxylate and methyl 11$\beta$-hydroxy-16$\beta$-methyl-3-oxo-17$\alpha$-propionyloxy-androsta-1,4-diene-17$\beta$-carboxylate.

The invention further includes the compound 2'-hydroxyethyl-9$\alpha$-fluoro-11$\beta$-hydroxy - 16$\beta$ - methyl-3-oxo-17$\alpha$ - propionyloxyandrosta-1,4-diene - 17$\beta$ - carboxylate which is useful as an intermediate for the preparation of the corresponding halogen substituted alkyl derivatives and moreover has topical anti-inflammatory activity.

There are also provided pharmaceutical compositions for use in anti-inflammatory therapy, comprising at least one androstane compound of formula I (as defined above), together with one or more pharmaceutical carriers or excipients. Such compositions may be in forms adapted for topical or internal administration.

The active androstane compound may be formulated into a preparation suitable for topical administration with the aid of a topical vehicle therefor. Examples of various types of preparation for topical administration, include ointments, lotions, creams, powders, drops (e.g. eye or ear drops), sprays (e.g. for the nose or throat), suppositories, retention enemas, chewable or suckable tablets or pellets (e.g. for the treatment of aphthous ulcers) and aerosols. Ointments and creams may for example, be formulated with an aqueous or oily base with the addition of suitable thickening and/or gelling agents, and/or glycols. Such base may thus, for example, include water and/or an oil such as liquid paraffin or a vegetable oil such as arachis oil or castor oil, or a glycolic solvent such as propylene glycol or 1,3-butane-diol. Thickening agents which may be used according to the nature of the base include soft paraffin, aluminium stearate, cetostearyl alcohol, polyethylene glycols, woolfat, hydrogenated lanolin and beeswax and/or glyceryl monostearate and/or non-ionic emulsifying agents.

Lotions may be formulated with an aqueous or oily base and will in general also include one or more of the following namely, emulsifying agents, dispersing agents, suspending agents, thickening agents, colouring agents and perfumes.

Powders may be formed with the aid of any suitable powder base, e.g. talc, lactose or starch. Drops may be formulated with an aqueous base also comprising one or more dispersing agents, suspending agents or solubilising agents, etc.

Spray compositions may for example be formulated as aerosols with the use of a suitable propellant, e.g. dichlorodifluoromethane or trichlorofluoromethane.

The proportion of active androstane compound in the topical compositions according to the invention depends on the precise type of formulations to be prepared but will generally be within the range of from 0.0001 to 5.0% by weight. Generally however for most types of preparations advantageously the proportion used will be within the range of from 0.001 to 0.5% and preferably 0.01 to 0.25%.

Topical preparations may be administered by one or more applications per day to the affected area; over skin areas occlusive dressings may often be used with advantage.

For internal administration the new compounds according to the invention may, for example, be formulated for oral parenteral or rectal administration. For oral administration, syrups, elixirs, powders and granules may be used which may be formulated in conventional manner. Dosage unit forms are however preferred as described below.

For parenteral administration the compounds may be presented in sterile aqueous or oily vehicles, suitable oily vehicles including arachis oil, olive oil, etc.

Preferred forms of preparation for internal administration are dosage unit forms, i.e., presentations in unitary form in which each unit contains a desired dose of the active steroid. Such dosage unit forms contain from 0.05 to 2.0 mg., preferably from 0.25 to 1.0 mg. of the active steroid. For oral administration suitable dosage unit forms include tablets, coated tablets and capsules. For parenteral administration dosage unit forms include sealed ampoules or vials each containing a desired dose of the steroid. Suppositories, which may be prepared for example with conventional commercial suppository bases, provide a dosage unit form for rectal administration. Sterile tablet or pellet implants may also be used, e.g. where slow systemic absorption is desired.

The compounds according to the invention may in general be given by internal administration in cases where systemic adreno-cortical therapy is indicated.

In general terms preparations for internal administration may contain from 0.01 to 5.0% of active ingredient dependent upon the type of preparation involved. The daily dose may vary from 0.05 to 10.0 mg. dependent on the condition being treated and the duration of treatment desired.

The compositions according to the invention may also include one or more preservatives or bacteriostatic agents, e.g., methyl hydroxy benzoate, propyl hydroxy benzoate, chlorocresol or benzalkonium chlorides. The compositions according to the invention may also contain other active ingredients such as antimicrobial agents, particularly antibiotics, such as neomycin.

The compounds of formula I (as defined above) may be generally prepared by esterifying a corresponding $17\alpha$-monoester $17\beta$-carboxylic acid (or functional equivalent thereof) or $17\alpha$-hydroxy $17\beta$-carboxylate to produce the desired compound of formula I.

As is well known to those skilled in the art it may frequently be convenient to elaborate the desired substituents in the $17\alpha$- and $17\beta$-positions at an intermediate stage of the preparation of the desired final compound, one or more other substituents (or unsaturation) being introduced at a later stage. For example, it is possible for the preparation of 11-oxo compounds first to prepare an $11\beta$-hydroxy compound having the desired $17\alpha$-acyloxy group and the desired $17\beta$-carboxylate ester group and then oxidise the $11\beta$-hydroxy group. Other instances where the desired substituents may be introduced before final elaboration of the remainder of the desired androstane molecule include for example preparing $\Delta^{9(11)}$ or Ring A saturated compounds having the desired $17\alpha$-acyloxy and $17\beta$-carboxylate ester groups, completion of the elaboration of Rings A, B and C then being completed in conventional manner.

The elaboration of the characteristic 17-substituents of our new androstane compounds may be conveniently effected from pregnane compounds (having the following partial formula at the 17-position:

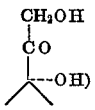

by an oxidation in known manner to form a corresponding androstane $17\beta$-carboxylic acid which acid may then be esterified. The $17\alpha$-hydroxy group may be esterified or otherwise functionally converted prior to oxidation, and thereafter regenerated or converted, if desired, to a different $17\alpha$-acyloxy group.

The oxidative removal of the 21-carbon atom of the pregnane starting material may be effected for example with periodic acid, in a solvent medium and preferably at room temperature. Alternatively, sodium bismuthate may be employed to effect the desired oxidative removal of the 21-carbon atom of a $17\alpha$-acyloxy pregnane compound.

As will be appreciated should the starting pregnane compound contain any substituent sensitive to the above-described oxidation such group should be suitably protected.

The parent $17\beta$-carboxylic acids of compounds of formula I may be esterified in known manner to provide $17\beta$-carboxylate esters according to the invention. For example, in order to prepare a lower alkyl ester the $17\beta$-carboxylic acid may be reacted with an appropriate diazoalkane, e.g. diazomethane, the reaction being preferably effected in a solvent medium, e.g. ether, tetrahydrofuran or methanol, and at a low temperature, preferably at $-5$ to $+30°$ C. Alternatively, the $17\beta$-carboxylic acid may be reacted with an appropriate O-alkyl-$N,N^1$-dicyclohexyl-isourea e.g. O-t-butyl-$N,N^1$-dicyclohexyl isourea, preferably in an aprotic solvent such as ethyl acetate, and advantageously at a temperature of 25–100° C. Alternatively, a salt of the parent $17\beta$-carboxylic acid for example, an alkali metal e.g. lithium, sodium or potassium, salt or a quaternary ammonium, e.g. triethyl ammonium or tetrabutyl ammonium, salt may be reacted with and appropriate alkylating agent, for example, an alkyl halide e.g. the iodide or a dialkyl sulphate e.g. dimethylsulphate, preferably in a polar solvent medium such as acetone, methylethyl ketone or dimethyl formamide, conveniently at a temperature in the range 25–100° C. The reaction with an alkyl halide may conveniently be employed to prepare the ethyl and propyl $17\beta$-carboxylate esters and higher alkyl esters according to the present invention.

Alternatively, the parent $17\alpha$-hydroxy-$17\beta$-carboxylic acids of the compounds of formula I may be esterified in known manner to provide the corresponding $17\alpha$-hydroxy-$17\beta$-carboxylate esters. For example, the $17\beta$-carboxylic acid may be reacted with a diazoalkane or an O-alkyl-dicyclohexyl-isourea, or a salt of the $17\beta$-carboxylic acid may be reacted with an alkylating agent as described above for the preparation of the $17\beta$-carboxylate esters of the invention. The $17\alpha$-hydroxy-$17\beta$-carboxylate esters may then be further esterified in known manner to produce the compounds of the invention.

The esterification of the $17\alpha$-hydroxy group in the above-described preparation of the new androstane compounds may be effected in known manner, e.g. by reacting the parent $17\alpha$-hydroxy compound with an appropriate carboxylic acid, advantageously in the presence of trifluoroacetic anhydride and preferably in the presence of an acid catalyst, e.g. p-toluene-sulphonic acid or sulphosalicylic acid.

The reaction is advantageously effected in an organic solvent medium such as benzene, methylene chloride or an excess of the carboxylic acid employed, the reaction being conveniently effected at a temperature of 20–100° C.

Alternatively, the $17\alpha$-hydroxy group may be esterified by reaction of the parent $17\alpha$-hydroxy compound with the appropriate acid anhydride or acid chloride, if desired, in the presence of non-hydroxylic solvents, e.g. chloroform, methylene chloride or benzene, and preferably in the presence of a strong acid catalyst, e.g. perchloric acid, p-toluene sulphonic acid or a strongly acidic cation exchange resin, e.g. Amberlite IR 120, the reaction being conveniently effected at a temperature of 25 to 100° C.

For the preparation of the $17\alpha$-esters of the $17\beta$-carboxylic acids which may be employed in the preparation of the compounds according to the invention, it is often preferred to treat the parent $17\alpha$-hydroxy compound with the appropriate carboxylic acid anhydride to give the $17\alpha$-ester of the mixed anhydride of the androstane $17\beta$-carboxylic acid and the carboxylic acid of the starting anhydride, this reaction being conveniently effected at an elevated temperature, the resulting anhydride then being solvolysed under acidic conditions (e.g. using aqueous acetic acid) or under basic conditions (e.g. using aqueous pyridine or a secondary amine such as diethylamine in acetone).

Alternatively, the parent 17α-hydroxy compound may be treated with the appropriate carboxylic acid chloride, preferably in a solvent such as an halogenated hydrocarbon e.g. methylene chloride, and advantageously in the presence of a base such as triethylamine, preferably at a low temperature e.g. 0° C.

Compounds wherein the 11-position contains a keto group may be prepared for example by oxidation of a corresponding 11β-hydroxy compound, e.g. by means of chromium trioxide, conveniently in an inert solvent such as acetone, preferably in the presence of sulphuric acid. Alternatively, chromium trioxide in the presence of pyridine may be employed.

The above-described oxidation of an 11β-hydroxy group into an 11-keto group may be effected at any convenient stage in the synthesis of the androstane compounds, e.g. prior to or after the oxidative removal of the 21-carbon atom of the above-mentioned pregnane starting material or the esterification of the 17α-hydroxy group.

Those compounds of formula I (wherein $R_4$ represents a lower alkyl group substituted by either at least one halogen atom or a lower alkoxycarbonyl group; or a lower ($C_{2-4}$) alkyl group substituted by a lower acyloxy group) may be prepared for example by reacting a salt of the parent 17β-carboxylic acid with an appropriate halo compound serving to introduce the desired group $R_4$ in the compound of formula I.

This reaction is advantageously effected using as the salt of the parent 17β-carboxylic acid an alkali metal e.g. lithium, sodium or potassium, salt or a quaternary ammonium salt such as the triethylammonium or tetrabutylammonium salt, conveniently in a polar solvent such as acetone, methylethyl ketone or dimethyl formamide.

If desired, the substituted lower alkyl groups represented by $R_4$ in formula I may be suitably modified in conventional manner.

Thus, in the case when $R_4$ in formula I represents an alkyl group substituted by a lower alkoxy-carbonyl group, the resulting compound may, if desired, be converted into a compound wherein $R_4$ represents an alkyl group with a different alkoxycarbonyl substituent by ester exchange e.g. by treatment with methanol in the presence of an acid catalyst such as perchloric acid to convert an ethoxycarbonyl compound into the corresponding methoxycarbonyl compound.

In addition, the above-identified reaction of the salt of a 17β-carboxylic acid with a halo compound may be used to prepare compounds of the type of formula I wherein $R_4$ represents a lower alkyl group containing at least two carbon atoms substituted by a hydroxy group (in other than the α-position) which compounds may be converted into the corresponding halogen-substituted compounds via the corresponding sulphonyloxyalkyl e.g. mesyloxyalkyl derivatives, such conversion being carried out in conventional manner.

Thus, the sulphonyloxyalkyl compound may be advantageously reacted with an alkali metal, alkaline earth metal or quaternary ammonium halide, preferably lithium chloride, conveniently in a solvent medium comprising, for example, acetone, dimethyl formamide or ethanol.

Alternatively, the above-mentioned hydroxy-alkyl derivatives may be acylated e.g. with an appropriate carboxylic acid chloride or anhydride to produce compounds of formula I according to the invention wherein $R_4$ represents a ($C_{2-4}$) alkyl group substituted by a lower acyloxy group.

Compounds of formula I wherein $R_4$ represents a lower alkyl group substituted by a halogen atom at the carbon atom attached to the oxygen atom of the 17β-carboxylate may be prepared for example by reacting the parent 17β-carboxylic acid with an appropriate aldehyde in the presence of a hydrohalic acid. The reaction may advantageously be effected in the presence of a catalyst for example, zinc chloride.

The $\Delta^4$ compounds according to the invention can conveniently be prepared by partial reduction of the corresponding $\Delta^{1,4}$ compound, for example, by hydrogenation using a palladium catalyst, conveniently in a solvent e.g. ethyl acetate or by homogeneous hydrogenation using for example tris(triphenyl phosphine) rhodium chloride, conveniently in a solvent such as benzene, or by exchange hydrogenation using for example cyclohexene in the presence of a palladium catalyst in a solvent e.g. ethanol, preferably under reflux.

It is to be noted that androstane compounds corresponding to our new class of 17α-acyloxy compounds of the androstane series of formula I but characterised by a free hydroxy group at position 17 in the α configuration are new compounds apart from those compounds wherein X and $R_2$ are both hydrogen, $R_4$ is a methyl group, = is a single bond and $R_1$ is a β-hydroxy or oxo group. Such new compounds are useful intermediates for the preparation of our new 17α-acyloxy compounds and constitute a further feature of the invention.

Other novel androstane compounds of use as intermediates in the preparation of the compounds of general formula I include the parent 17β-carboxylic acids of such compounds and their anhydrides, e.g. their mixed anhydrides with lower alkanoic acids, especially lower alkanoic acids such as acetic and propionic acids. Such 17β-carboxylic acids and their anhydrides also constitute further features of the present invention.

For a better understanding of the invention, the following examples are given by way of illustration only.

In the following Examples Nos. 1–38, the preparation of the compounds is described by reference to the following general methods of preparation A to F given below, details of the compound prepared in each case and its physical constants being given in the subsequent tables.

Method A

Preparation of androstane - 17β - carboxylic acids.—A solution of the 20-keto-21-hydroxy pregnane steroid (1 part) in methanol (50 parts w./v.) was treated with a solution of periodic acid (1.5 parts w./w.) in water (10 parts w./v.) at room temperature until the reaction was judged complete (thin-layer chromatography). Most of the methanol was evaporated and after addition of water the solid steroid 17β-carboxylic acid was removed by filtration and purified by crystallization.

Method B

Methylation of androstane 17β-carboxylic acids.—The androstane 17β-carboxylic acid (1 part) was dissolved in methanol (62–75 parts w./v.) and treated at 0° C. with an ethereal solution of diazomethane until a yellow colour persisted and the reaction was shown to be complete by thin-layer chromatography. After destruction of the excess diazomethane with a few drops of acetic acid the reaction mixture was evaporated to dryness *in vacuo* and the residue purified by crystallization.

Method C

Ethylation and propylation of androstane - 17β - carboxylic acids.—The androstane - 17β - carboxylic acid (1 part) in acetone (100 parts w./v.) was treated with triethylamine (1.2–5.0 equivalents based on the steroid) and then ethyl or propyl iodide (5 equivalents based upon the steroid). The mixture was refluxed until thin-layer chromatography indicated that the reaction was complete. Most of the solvent was removed *in vacuo* and the residue diluted with water to afford the product which was removed by filtration and purified by crystallization.

PREPARATION OF C–17 ESTERS BY ACYLATION OF 17α - HYDROXYANDROSTANE-17β-CARBOXYLATES

Method D

The 17α-hydroxy - 17β- carboxylate (1 part) was mixed with the appropriate aliphatic carboxylic acid (10 parts w./v.), trifluoracetic anhydride (1–2.4 part w./v.) and toluene-p-sulphonic acid (0.005–0.03 parts w./w. added as an anhydrous solution in chloroform) and the mixture heated in an oil bath at 80° C. until the reaction was judged, by thin-layer chromatography, to be complete. The cooled reaction mixture was poured into excess dilute sodium bicarbonate solution and stirred until all the excess anhydride had been decomposed. The precipitated product was removed by filtration and purified by crystallization.

Method E

The 17α-hydroxy-17β-carboxylate (1 part) in the appropriate aliphatic carboxylic acid (about 20 parts w./v.) was treated with trifluoroacetic anhydride (5 parts w./v.) and toluene-p-sulphonic acid (about 6 mg. as an anhydrous solution in chloroform) and the mixture kept at room temperature until the reaction was judged complete (t.l.c.). The mixture was poured into dilute sodium bicarbonate solution and the precipitated product was removed by filtration, dried and recrystallized.

Method F

Oxidation of 11β-hydroxy steroids to 11-ketones.—The 11β-hydroxy steroid (1 part) was dissolved in acetone (25–150 parts w./v.), cooled in an ice-bath and a solution of chromium trioxide (prepared by adding concentrated sulphuric acid (53.3 ml.) to chromium trioxide (66.7 g.) in water and making the volume up to 250 ml. by addition of water) (1.6–2.08 equivalents) was added. When the reaction was judged complete (t.l.c.) the mixture was diluted with ether or ether and ethyl acetate and washed thoroughly with water. Evaporation of the solvent afforded the crude 11-ketone which was purified by crystallization.

TABLE I

General formula:

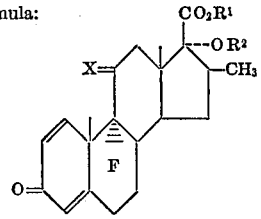

Example Nos. 1–17

| $R^1$ | $R^2$ | X | Method of preparation | Cryst. solvent* | M.P., °C. | $[\alpha]_D$ (dioxan) | $\lambda_{max.}$, nm. | $\epsilon$ | Empirical formula | Found C | Found H | Required C | Required H |
|---|---|---|---|---|---|---|---|---|---|---|---|---|---|
| H | H | α-H; β-OH | A | A-P.E. | 256–258 | +62.5 | 238 | 15,200 | $C_{21}H_{27}FO_5$ | 67.05 | 7.2 | 66.65 | 7.2 |
| $CH_3$ | H | α-H; β-OH | B | A-P.E. | 241–243 | +71.6 | 239 | 15,100 | $C_{22}H_{29}FO_5$ | 67.3 | 7.5 | 67.35 | 7.45 |
| $C_2H_5$ | H | α-H; β-OH | C | A-P.E. | 222–225 | +68.6 | 238 | 15,200 | $C_{23}H_{31}FO_5$ | 67.3 | 7.8 | 67.95 | 7.7 |
| $C_3H_7$ | H | α-H; β-OH | C | A-P.E. | 191–193 | +57.2 | 238 | 15,100 | $C_{24}H_{33}FO_5$ | 68.2 | 8.0 | 68.55 | 7.9 |
| $CH_3$ | $COCH_3$ | α-H; β-OH | D | A | 233–235 | +36.6 | 238 | 16,200 | $C_{24}H_{31}FO_6$ | 66.6 | 7.0 | 66.35 | 7.2 |
| $CH_3$ | $COC_2H_5$ | α-H; β-OH | $D^1$ | A-P.E. | 232–235 | +35.2 | 238 | 15,400 | $C_{25}H_{33}FO_6$ | 66.9 | 7.2 | 66.95 | 7.4 |
| $CH_3$ | $COC_3H_7$ | α-H; β-OH | D | A | 235–236 | +31.8 | 238 | 15,700 | $C_{26}H_{35}FO_6$ | 67.6 | 7.5 | 67.5 | 7.6 |
| $C_2H_5$ | $COCH_3$ | α-H; β-OH | $D^3$ | A-P.E. | 255 | | 238 | 15,100 | $C_{25}H_{33}FO_6$ | 66.8 | 7.4 | 66.95 | 7.4 |
| $C_2H_5$ | $COC_2H_5$ | α-H; β-OH | $D^4$ | A-P.E. | 196 | +34.2 | 238 | 15,300 | $C_{26}H_{35}FO_6$ | 67.4 | 7.5 | 67.5 | 7.6 |
| $C_2H_5$ | $COC_3H_7$ | α-H; β-OH | $D^5$ | A-P.E. | 175–178 | +35.5 | 238 | 15,100 | $C_{27}H_{37}FO_6$ | 67.4 | 7.5 | 68.05 | 7.85 |
| $C_3H_7$ | $COCH_3$ | α-H; β-OH | $D^6$ | A-P.E. | 240–242 | | 238 | 15,200 | $C_{26}H_{35}FO_6$ | 67.25 | 7.6 | 67.5 | 7.6 |
| $C_3H_7$ | $COC_2H_5$ | α-H; β-OH | $D^7$ | A-P.E. | 178–180 | +38.6 | 238 | 15,150 | $C_{27}H_{37}FO_6$ | | | 68.05 | 7.85 |
| $C_3H_7$ | $COC_3H_7$ | α-H; β-OH | $D^5$ | A-P.E. | 175–177 | +34.8 | 238 | 15,300 | $C_{28}H_{39}FO_6$ | 68.6 | 8.0 | 68.55 | 8.4 |
| $CH_3$ | $COCH_3$ | =O | F | A-P.E. | 258–260 | +78.6 | 235 | 15,800 | $C_{24}H_{29}FO_6$ | 66.55 | 6.8 | 66.65 | 6.75 |
| $CH_3$ | $COC_2H_5$ | =O | F | A-P.E. | 228–230 | | 235 | 15,600 | $C_{25}H_{31}FO_6$ | 67.6 | 7.1 | 67.25 | 7.0 |
| $CH_3$ | $COC_3H_7$ | =O | F | A-P.E. | 213–215 | +69.9 | 235 | 14,100 | $C_{26}H_{33}FO_6$ | 67.8 | 7.05 | 67.8 | 7.2 |
| $C_2H_5$ | $COC_2H_5$ | =O | F | A-P.E. | 183–185 | | 235 | 14,700 | $C_{26}H_{33}FO_6$ | 67.4 | 7.3 | 67.8 | 7.2 |

[1] The reaction mixture was partly evaporated in vacuo before dilution with sodium bicarbonate solution. The crude product was filtered through a short column of grade III neutral alumina in chloroform before crystallizing.
[3] A further quantity of trifluoroacetic anhydride (0.5 parts w./v.) was added to the reaction mixture.
[4] The crude product was extracted with ethyl acetate and purified by preparative thin-layer chromatography.
[5] No toluene-p-sulphonic acid was added to the reaction mixture which was heated to 65°.
[6] The crude product was purified by preparative thin-layer chromatography before crystallizing.
[7] No toluene-p-sulphonic acid was added to the reaction mixture.
*A=Acetone; P.E.=Petroleum-ether.

TABLE II

General formula:

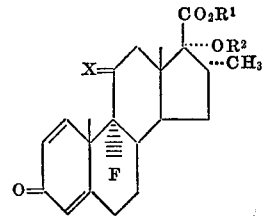

| Example number | $R^1$ | $R^2$ | X | Method of preparation | Cryst. solvent | M.P., °C. | $[\alpha]_D$ (dioxan) | $\lambda_{max.}$, nm. | $\epsilon$ | Empirical formula | Found C | Found H | Required C | Required H |
|---|---|---|---|---|---|---|---|---|---|---|---|---|---|---|
| 18 | H | H | α-H; β-OH | A | A-P.E. | **>258 | +46.6 | 238 | 15,800 | $C_{21}H_{27}FO_5$ | 66.6 | 7.25 | 66.65 | 7.2 |
| 19 | $CH_3$ | H | α-H; β-OH | $B^1$ | A-P.E. | 271–273 | +38.5 | 238 | 15,200 | $C_{22}H_{29}FO_5$ | 67.0 | 7.3 | 67.35 | 7.45 |
| 20 | $CH_3$ | $COCH_3$ | α-H; β-OH | D | A-P.E. | 316–319 | +11.5 | 238 | 15,700 | $C_{24}H_{31}FO_6$ | 66.45 | 7.1 | 66.35 | 7.2 |
| 21 | $CH_3$ | $COC_2H_5$ | α-H; β-OH | $D^2$ | A-P.E. | 230–233 | +15 | 238 | 15,000 | $C_{25}H_{33}FO_6$ | 66.55 | 7.65 | 66.95 | 7.4 |
| 22 | $CH_3$ | $COC_3H_7$ | α-H; β-OH | $D^2$ | A-P.E. | 199–201 | +14.3 | 238 | 14,700 | $C_{26}H_{35}FO_6$ | 67.9 | 7.65 | 67.5 | 7.65 |
| 23 | $CH_3$ | $COC_2H_5$ | =O | F | A-P.E. | 185–188 | +49.2 | 235 | 16,200 | $C_{25}H_{31}FO_6$ | 67.1 | 6.9 | 67.25 | 7.0 |

[1] The crude product obtained by evaportation of the methanolic reaction mixture was dissolved in ethyl acetate and washed with dilute sodium bicarbonate and water before crystallization.
[2] The crude product was extracted with ethyl acetate and purified by preparative thin-layer chromatography.
*A=Acetone; P.E.=Petroleum-ether.
** Decomposition.

TABLE III

General formula:

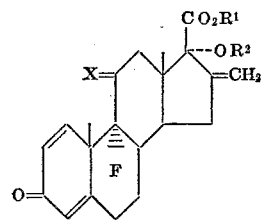

| Ex. No. | R¹ | R² | X | Method of preparation | Cryst. solvent* | M.P., °C. | $[\alpha]_D$ (dioxan) | $\lambda_{max.}$, nm. | $\epsilon$ | Empirical formula | Found C | Found H | Required C | Required H |
|---|---|---|---|---|---|---|---|---|---|---|---|---|---|---|
| 24 | H | H | α-H; β-OH | A | A | 236–238 | −23.4 | 238 | 15,500 | $C_{21}H_{25}F_5$ | 67.1 | 6.9 | 67.0 | 6.7 |
| 25 | $CH_3$ | H | α-H; β-OH | B | M | 285–287 | −24.5 | 238 | 15,000 | $C_{22}H_{27}FO_5$ | 67.5 | 7.2 | 67.7 | 6.95 |
| 26 | $C_2H_5$ | H | α-H; β-OH | C | M | 258–261 | −23.2 | 238 | 15,410 | $C_{23}H_{29}FO_5$ | 68.0 | 6.9 | 68.3 | 7.25 |
| 27 | $CH_3$ | $COCH_3$ | α-H; β-OH | D¹ | M | 254–258 | −94.0 | 238 | 15,720 | $C_{24}H_{29}FO_6$ | 66.5 | 6.9 | 66.65 | 6.75 |
| 28 | $CH_3$ | $COC_2H_5$ | α-H; β-OH | D² | M | 198–200 | −97.5 | 238 | 15,200 | $C_{25}H_{31}FO_6$ | 67.1 | 7.1 | 67.25 | 7.0 |
| 29 | $CH_3$ | $COC_3H_7$ | α-H; β-OH | D² | M | 189–192 | −86.5 | 238 | 15,580 | $C_{26}H_{33}FO_6$ | 67.4 | 7.4 | 67.8 | 7.2 |
| 30 | $CH_3$ | $COCH(CH_3)_2$ | α-H; β-OH | D³ | M | 185–187 | −84.0 | 238 | 15,580 | $C_{26}H_{33}FO_6$ | 67.8 | 7.4 | 67.8 | 7.2 |
| 31 | $C_2H_5$ | $COCH_3$ | α-H; β-OH | D | M | 278–280 | −99.0 | 238 | 15,300 | $C_{25}H_{31}FO_6$ | 67.1 | 6.9 | 67.25 | 7.0 |
| 32 | $C_2H_5$ | $COC_2H_5$ | α-H; β-OH | D³ | M | 195–197 | −85.1 | 238 | 15,800 | $C_{26}H_{33}FO_6$ | 67.7 | 7.2 | 67.8 | 7.2 |
| 33 | $C_2H_5$ | $COCH(CH_3)_2$ | α-H; β-OH | D² | EtOAc | 145–148 | −79.5 | 238 | 15,600 | $C_{27}H_{35}FO_6$ | 68.6 | 7.2 | 68.35 | 7.45 |
| 34 | $CH_3$ | $COCH_3$ | =O | F | M | 229–232 | −42.7 | 235 | 15,390 | $C_{24}H_{27}FO_6$ | 66.8 | 6.3 | 66.95 | 6.3 |

¹ The crude product was purified by preparative thin-layer chromatography before crystallizing.
² The crude product was extracted into ethyl acetate and purified by preparative thin-layer chromatography before crystallizing.
³ The crude product was extracted with ethyl acetate.
*A=Acetone; M=Methanol.

TABLE IV

General formula:

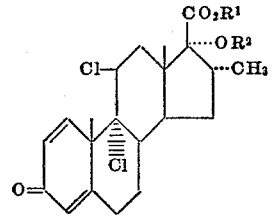

| Example number | R¹ | R² | Method of preparation | Cryst. solvent* | M.P., °C. | $[\alpha]_D$ (dioxan) | $\lambda_{max.}$, nm. | $\epsilon$ | Empirical formula | Found C | Found H | Required C | Required H |
|---|---|---|---|---|---|---|---|---|---|---|---|---|---|
| 35 | H | H | A¹ | A-EtOH-P.E. | 264–266 | +23.6 | 237 | 14,300 | $C_{21}H_{26}Cl_2O_4$ ² | 6.10 | 6.3 | 61.0 | 6.35 |
| 36 | $CH_3$ | H | B³ | A-P.E. | 248–251 | +17.6 | 237 | 14,500 | $C_{22}H_{28}Cl_2O_4$ ⁴ | 61.8 | 6.6 | 61.85 | 6.6 |
| 37 | $CH_3$ | $COCH_3$ | E | A-H | 253–255 | +73.6 | 236 | 13,900 | $C_{24}H_{30}Cl_2O_5$ | 61.2 | 6.4 | 61.4 | 6.45 |
| 38 | $CH_3$ | $COC_2H_5$ | E | A-H | 237–239 | +73.0 | 236 | 14,100 | $C_{25}H_{32}Cl_2O_5$ | 6.20 | 6.6 | 62.1 | 6.65 |

¹ 120 parts (w./v.) of methanol was used and a little dioxan added to aid dissolution of the steroid.
² Found: Cl, 17.2. Required, Cl, 17.2%.
³ The crude product from evaporation of the methanol was dissolved in chloroform and filtered through a short plug of neutral grade III alumina before crystallization.
⁴ Found: Cl, 16.8. Required, Cl, 16.6%.
*A=Acetone; P.E.=Petroleum-ether; H=Hexane.

EXAMPLE 39

Methyl 9α-fluoro-11β,17α-dihydroxy-16β-methyl-3-oxo-androsta-1,4-diene-17β-carboxylate Methyl iodide (12 ml.) was added to a solution of 9α-fluoro-11β,17α-dihydroxy-16β-methyl - 3 - oxo-androsta-1,4-diene-17β-carboxylic acid (10.045 g.) in acetone (500 ml.) containing triethylamine (4.6 ml.) and the mixture refluxed, more methyl iodide (6 ml.) being added after 4 hours. After 5.25 hours most of the solvent was evaporated *in vacuo* and the residue diluted with sodium bicarbonate solution. The precipitated solid was removed by filtration and, after drying, was filtered through a short plug of grade (III) neutral alumina in ethyl acetate containing a little methanol. Evaporation of the eluate gave methyl 9α-fluoro-11β,17α-dihydroxy-16β-methyl-3-oxo-androsta-1,4-diene-17β-carboxylate with infrared and N.M.R. spectra resembling that of the methyl ester prepared with diazomethane.

EXAMPLE 40

17α-Acetoxy-9α-fluoro-11β-hydroxy-16β-methyl-3-oxo-androsta-1,4-diene-17β-carboxylic acetic anhydride 9α - Fluoro-11β,17α-dihydroxy-16β-methyl - 3 - oxo-androsta-1,4-diene-17β-carboxylic acid (1 g.) was suspended in acetic anhydride (15 ml.) and heated on a steam-bath for 45 minutes and then at 115° for 1 hour by which time all the steroid had dissolved. The mixture was cooled and the precipitated material removed by filtration and recrystallized from acetone-hexane to afford 17α-acetoxy-9α-fluoro-11β-hydroxy - 16β - methyl-3-oxo-androsta-1,4-diene-17β-carboxylic acetic anhydride, m.p. 218–220°, $[\alpha]_D$ +42.4° (c 0.8, dioxan), $\lambda_{max}$. 238 nm. ($\epsilon$ 15,900). (Found: C, 64.65; H, 6.5. $C_{25}H_{31}FO_7$ requires C, 64.9; H, 6.75%.)

EXAMPLE 41

17α-Acetoxy-9α-fluoro-11β-hydroxy-16β-methyl-3-oxo-androsta-1,4-diene-17β-carboxylic acid (1) 17α-Acetoxy-9α-fluoro-11β-hydroxy - 16β - methyl-3-oxoandrosta-1,4-diene-17β-carboxylic acetic anhydride (530 mg.) was dissolved in acetic acid (100 ml.) and water (50 ml.) added and the mixture kept at room temperature until reaction was complete (45 minutes). Evaporation *in vacuo* afforded the product which, after crystallization from acetone-petroleum ether gave 17α-acetoxy-9α-fluoro - 11β - hydroxy - 16β - methyl-3-oxo-androsta-1,4-diene-17β-carboxylic acid, m.p. 212–214°, $[\alpha]_D$ +22.2° (c 0.8, dioxan), $\lambda_{max}$. 239 nm. ($\epsilon$ 14,700). (Found: C, 64.1; H, 7.1. $C_{23}H_{29}FO_6$ requires C, 64.3; H, 7.05%.)

(2) 17α-Acetoxy-9α-fluoro-11β-hydroxy - 16β - methyl-3-oxoandrosta-1,4-diene-17β-carboxylic acetic anhydride (57 mg.) was dissolved in 50% aqueous pyridine (8 ml.) and kept at room temperature for 45 minutes. Evaporation of the solvent gave a solid whose infrared and N.M.R.

spectra were similar to those of the material prepared in (1) above.

EXAMPLE 42

9α - Fluoro - 11β - hydroxy-16β-methyl-3-oxo-17α-propionyloxyandrosta-1,4-diene - 17β - carboxylic propionic anhydride 9α-Fluoro-11β,17α-dihydroxy-16β-methyl - 3 - oxoandrosta-1,4-diene-17β-carboxylic acid (1 g.) was suspended in propionic anhydride (15 ml.) and heated in an oil bath at 115° for 15 minutes during which time the steroid dissolved. The reaction mixture was diluted with petroleum ether (100 ml.) to afford a white crystalline solid which was removed by filtration and dried. Recrystallization from acetone-hexane gave 9α-fluoro-11β-hydroxy-16β-methyl - 3 - oxo-17α-propionyloxy-androsta-1,4-diene-17β-carboxylic propionic anhydride, m.p. 180–182°, $[\alpha]_D$ +50.5° ($c$ 0.7, dioxan), $\lambda_{max}$ 238 nm. ($\epsilon$ 15,700). (Found: C, 66.4; H, 7.1. $C_{27}H_{35}FO_7$ requires C, 66.1; H, 7.2%).

EXAMPLE 43

9α-Fluoro-11β-hydroxy-16β-methyl-3-oxo-17α-propionyloxyandrosta-1,4-diene-17β-carboxylic acid (1) 9α-Fluoro-11β-hydroxy - 16β - methyl-3-oxo-17α-propionyloxyandrosta-1,4-diene-17β-carboxylic propionic anhydride (342 mg.) was dissolved in acetic acid (25 ml.) and water (15 ml.) added and the mixture kept at room temperature until the reaction was judged complete (t.l.c.). Evaporation in vacuo of most of the solvent and dilution with water afforded the product which was recrystallized from acetone-hexane to give 9α-fluoro-11β-hydroxy-16β-methyl - 3 - oxo - 17α - propionyloxyandrosta-1,4-diene-17β-carboxylic acid, m.p. 188–190°, $\lambda_{max}$ 239 nm. ($\epsilon$ 15,600). (Found: C, 65.1; H, 7.5. $C_{24}H_{31}FO_6 \cdot Me_2CO$ requires C, 65.8; H, 7.6%.)

(2) 9α-Fluoro-11β-hydroxy - 16β - methyl-3-oxo-17α-propionyloxyandrosta-1,4-diene-17β-carboxylic propionic anhydride (6.93 g.) in acetone (150 ml.) was treated with diethylamine (5 ml.) and the mixture kept at room temperature for about 0.5 hours. The solvent was evaporated in vacuo and the residue was dissolved in water, acidified and extracted with ethyl acetate. The washed organic layer was evaporated in vacuo to give a solid which was triturated with ether to give 9α-fluoro-11β-hydroxy-16β-methyl - 3 oxo-17α-propionyloxyandrosta-1,4-diene-17β-carboxylic acid.

EXAMPLE 44

Methyl 9α fluoro - 16 - methylene-3,11-dioxo-17α-propionyloxy-androsta-1,4-diene-17β-carboxylate Methyl 9α - fluoro - 11β-hydroxy-16-methylene-3-oxo-17α-propionyloxylandrosta - 1, 4- diene - 17β-carboxylate (204 mg.) in acetone (4 ml.) was treated at room temperature with a solution of chromium trioxide [0.23 ml.; prepared by adding concentrated sulphuric acid (53.3 ml.) to chromium trioxide (66.7 g.) in water and making the volume up to 250 ml. with water]. After 30 minutes the reaction mixture was diluted with ether and washed successively with water, sodium bicarbonate solution and water. The dried ethereal solution was evaporated in vacuo and the residue was recrystallised from methanol to afford the title compound, m.p. 194–195°, $[\alpha]_D$ −37.8° ($c$ 1.06, dioxan), $\lambda_{max}$ 234.5 nm. ($\epsilon$ 15,800). (Found: C, 67.3; H, 6.7. $C_{25}H_{29}FO_6$ requires C, 67.55; H, 6.58%.)

EXAMPLE 45

Methyl 17α-benzoyloxy-9α-fluoro-11β-hydroxy-16β-methyl-3-oxo-androsta-1,4-diene-17β-carboxylate A suspension of methyl 9α - fluoro-11β,17α-dihydroxy-16β-methylandrosta - 1,4 - diene - 17β-carboxylate (439 mg.) in methylene chloride (15 ml.) was treated with benzoic acid (573 mg.), trifluoroacetic anhydride (0.6 ml.) and toluene-p-sulphonic acid (12 mg.) and the mixture was stirred at 80°. After 48 hours the mixture was cooled and diluted with methylene chloride and the solution was washed with sodium bicarbonate and water. Evaporation of the dried organic solution afforded a residue which was purified by preparative thin layer chromatography and crystallisation from methanol to give the title benzoate, m.p. 166–168°, $[\alpha]_D$ + 3.3° ($c$ 1.09, dioxan), $\lambda_{max}$ 232 nm. ($\epsilon$ 27,800). (Found: C, 70.0; H, 6.6. $C_{29}H_{33}FO_6$ requires C, 70.14; H, 6.7%.)

EXAMPLE 46

Methyl 9α-fluoro-11β-hydroxy-16β-methyl-3-oxo-17α-propionyloxy-androst-4-ene-17β-carboxylate A solution of methyl 9α - fluoro - 11β-hydroxy-16β-methyl - 3 - oxo-17α-propionyloxyandrosta-1,4-diene-17β-carboxylate (454 mg.) in ethanol (45 ml.) was treated with 5% palladium-charcoal (453 mg.) and cyclohexene (0.9 ml.) and the mixture was refluxed for 15 minutes. Filtration of the cooled mixture and evaporation of the solvent in vacuo afforded a froth which, after purification by preparative thin layer chromatography and crystallisation from acetone-petroleum ether gave the title compound, m.p. 204–208°, $\lambda_{max}$ 237.5 nm. ($\epsilon$ 15,400). (Found: C, 66.8; H, 7.8. $C_{25}H_{35}FO_6$ requires C, 66.65; H, 7.8%.)

EXAMPLE 47

Methyl 9α-fluoro-16β-methyl-3,11-dioxo-17α-propionyloxyandrost-4-ene-17β-carboxylate A solution of methyl 9α - fluoro - 11β-hydroxy-16β-methyl-3-oxo-17α-propionyloxyandrost - 4 - ene-17β-carboxylate (100 mg.) in acetone (7 ml.) was treated, at 0°, with a solution of chromium trioxide [0.09 ml.; prepared by adding concentrated sulphuric acid (53.3 ml.) to chromium trioxide (66.7 g.) in water and making the volume up to 250 ml. with water]. After 1.25 hours the mixture was diluted with ether and ethyl acetate and washed thoroughly with water. Evaporation of the organic solvent then afforded a white solid which was crystallised from acetone-petroleum ether to give the title compound, m.p. 218–220° after previous softening, $\lambda_{max}$ 234 nm. ($\epsilon$ 16,000). (Found: C, 66.55; H, 7.4. $C_{25}H_{33}FO_6$ requires C, 66.95; H, 7.4%.)

EXAMPLE 48

Methyl 17α-acetoxy-11β-hydroxy-3-oxoandrosta-1,4-diene-17β-carboxylate

Periodic acid (14.163 g.) in water (80 ml.) was added to a solution of prednisolone (8.286 g.) in methanol (800 ml.) and the resulting mixture was kept at room temperature. After 1 hour most of the methanol was evaporated in vacuo, the residue was diluted with water, and the crystalline 11β,17α - dihydroxy - 3 - oxoandrosta-1,4 - diene - 17β - carboxylic acid removed by filtration. The analytical sample which was crystallized from wet acetone and petroleum ether had m.p. 264–266.° (Found: C, 69.2; H, 7.4. $C_{20}H_{26}O_5$ requires C, 69.3; H, 7.5%.)

The above carboxylic acid (3.6 g.) in methanol (200 ml.) was treated at 0° with an ethereal solution of diazomethane until the mixture was yellow. Evaporation of most of the organic solvent in vacuo and dilution of the residue with water afforded crystalline methyl 11β,17α-dihydroxy - 3 - oxoandrosta - 1,4-diene-17β-carboxylate, m.p. 203–206°. A sample crystallised from acetone-hexane had m.p. 202–205°, $[\alpha]_D$ +59.6° ($c$ 0.8 dioxan), $\lambda_{max}$ 242.5 nm. ($\epsilon$ 15,100). (Found: C, 70.0; H, 7.9. $C_{21}H_{28}O_5$ requires C, 69.98; H, 7.83%.)

The above methyl ester (464 mg.) in acetic acid (5 ml.) was treated with trifluoroacetic anhydride (1 ml.) and the mixture stirred at room temperature. After 1 hour toluene - p - sulphonic acid (7 mg.) was added and the mixture kept at room temperature for a further 2.5 hours. Dilution of the solution with sodium bicarbonate solution afforded a precipitate which was removed by filtration and purified by preparative thin-layer chroma-

EXAMPLE 49

Methyl 9α-fluoro-11β,17α-dihydroxy-16β-methyl-3-oxoandrosta-1,4-diene-17β-carboxylate A solution of sodium 9α - fluoro-11β,17α-dihydroxy-16β-methyl - 3 - oxoandrosta - 1,4-diene-17β-carboxylate [prepared by titration of a solution of 9α-fluoro-11β, 17α-dihydroxy-16β-methyl-3 - oxoandrosta - 1,4-diene-17β - carboxylic acid (103 mg.) in methanol (20 ml.) with aqueous-methanolic N-sodium hydroxide solution to pH 8.3] was treated with methyl iodide (0.085 ml.) and the mixture was refluxed. After 16 hours the solvent was evaporated in vacuo, the residue triturated with water and the insoluble material removed by filtration.

The N.M.R. spectrum of this material in $(CD_3)_2SO$ showed methyl signals at γ 6.36, 8.47, 8.84, and 8.92 due to the title compound.

EXAMPLE 50

2'Hydroxyethyl-9α-fluoro-11β-methyl-3-oxo-17α-propionyloxyandrosta-1,4-diene-17β-carboxylate A solution of 9α-fluoro-11β-hydroxy-16β-methyl-3-oxo-17α-propionyloxy androsta-1,4-diene-17β-carboxylic acid (200 mg.) in acetone (20 ml.) was treated with redistilled triethylamine (0.38 ml.) and 2-iodoethanol (0.36 ml.) and the mixture was refluxed for 20 hours when the reaction was judged to be complete (t.l.c.). Most of the solvent was removed in vacuo and water (45 ml.) was added to give the product which was recrystallised, first from methanol then from acetone to give the title compound, m.p. 171–173°, $[\alpha]_D$ +39.7° (c 0.99, dioxan), $\lambda_{max.}$ 237.5 nm. (ε 15,650). (Found: C, 64.95; H, 7.2. $C_{26}H_{35}FO_7$ requires C, 65.3; H, 7.4%.)

EXAMPLE 51

2'-Methanesulphonyloxyethyl 9α-fluoro - 11β - hydroxy 16β-methyl-3 - oxo - 17α - propionyloxyandrosta - 1,4-diene-17β-carboxylate A solution of 2'-hydroxyethyl 9α-fluoro-11β-hydroxy-16β-methyl-3-oxo-17α-propionyloxyandrosta - 1,4 - diene-17β-carboxylate (240 mg.) in dry pyridine (1 ml.) was treated dropwise at —1° to —10° with redistilled methanesulphonyl chloride (0.2 ml.). After 40 minutes the mixture was poured into 2N-sulphuric acid (8 ml.) and triturated to give a solid which was purified by preparative thin-layer chromatography and recrystallisation from methanol to give the title compound, m.p. 129–131°, $\lambda_{max.}$ 238 nm. (ε 15,850). (Found: C, 58.5; H, 6.7. $C_{27}H_{37}FO_9S$ requires C, 58.3; H, 6.7%.)

EXAMPLE 52

2'-Chloroethyl 9α-fluoro-11β-hydroxy-16β-methyl-3-oxo-17α-propionyloxyandrosta-1,4-diene-17β-carboxylate A mixture of 2'-methanesulfonyloxyethyl 9α-fluoro-11β-hydroxy 16β-methyl - 3 - oxo - 17α - propionyloxy-androsta-1,4-diene-17β-carboxylate (223 mg.) and dry lithium chloride (170 mg.) on acetone (9 ml.) was refluxed for 22 hours. After removal of solvent in vacuo the residue was triturated with water to give a solid which was purified by preparative thin-layer chromatography and crystallisation from ether to afford the title chloroethyl ester, m.p. 194–196° $[\alpha]_D$ +43.4° (c 0.99, dioxan), $\lambda_{max.}$ 237 nm. (ε 15,800). (Found: C, 62.9: H, 6.9; Cl, 7.0. $C_{26}H_{34}ClFO_6$ requires C, 62.8; H, 6.9; Cl, 7.1%.)

EXAMPLE 53

2'-Bromoethyl 9α-fluoro-11β-hydroxy-16β-methyl-3-oxo-17α-propionyloxyandrosta-1,4-diene-17β-carboxylate Treatment of 2'-methanesulphonyloxyethyl 9α-fluoro-11β-hydroxy 16β-methyl - 3 - oxo - 17α - propionyloxy-androsta-1,4-diene-17β-carboxylate (222 mg.) with dry lithium bromide (348 mg.) in acetone (9 ml.) for 2 hours followed by work-up as described in Example 52, with purification from ether afforded the title bromoethyl ester, m.p. 182–184.5°, softening above 122°, $[\alpha]_D$ +38.8° (c 1.02, dioxan), $\lambda_{max.}$ 237.5 nm. (ε 16,000). (Found: C, 57.9; H, 6.3; Br, 14.6. $C_{26}H_{34}BrFO_6$ requires C, 57.7; H, 6.3; Br, 14.8%.)

EXAMPLE 54

9α-Chloro-11β,17α-dihydroxy-16β-methyl-3-oxoandrosta-1,4-diene-17β-carboxylic acid Treatment of 9α-chloro-11β,17α-21 - trihydroxy - 16β-methylpregna-1,4-diene-3,20-dione by the procedure described in Method A afforded, after recrystallisation from acetone-ethanol-petrol the title carboxylic acid, m.p. 247–249°, $[\alpha]_D$ +93.0° (c 0.7, dioxan), $\lambda_{max.}$ 238.5 nm. (ε 14,300). (Found: C, 63.3; H, 7.1. $C_{21}H_{27}ClO_4$ requires C, 63.85, H, 6.9%.)

EXAMPLE 55

9α-Chloro-11β-hydroxy-16β-methyl-3-oxo-17α-propionyloxyandrosta-1,4-diene-17β-carboxylic acid A mixture of 9α-chloro-11β,17α-dihydroxy-16β-methyl-3-oxoandrosta-1,4-diene-17β-carboxylic acid (1.42 g.) (35 ml.) was stirred at 0° and treated dropwise with propionyl chloride (1.32 ml.). After 35 minutes at 0° the solution was diluted with methylene chloride, washed successively with 3% sodium bicarbonate solution, N-hydrochloric acid and water; after being dried (magnesium sulphate) solvent was removed in vacuo to give a colourless crystalline solid. This solid was dissolved in acetone (40 ml.) and treated with redistilled diethylamine (1.3 ml.); concentration in vacuo gave the crystalline diethylamine salt which was collected, dried, dissolved in water and the solution was acidified with 2N-hydrochloric acid. The product was extracted with ethyl acetate and solvent was removed to give crystalline 9α-chloro-11β-hydroxy-16β-methyl-3-oxo-17α-propionyloxyandrosta - 1,4 - diene-17β-carboxylic acid (1.49 g.), m.p. 187–188° (decomp.), $[\alpha]_D$ +52.0° (C 0.95, dioxan), $\lambda_{max.}$ 238 nm.

$(E^{1\%}_{1cm}$ 315).

EXAMPLE 56

Methyl 9α-chloro-11β-hydroxy-16β-methyl-3-oxo-17α-propionyloxyandrosta-1,4-diene-17β-carboxylate A solution of 9α-chloro-11β-hydroxy-16β-methyl-3-oxo-17α-propionyloxyandrosta-1,4-diene-17β - carboxylic acid (501 mg.) in acetone (20 ml.) was cooled in ice and treated with an ethereal solution of diazomethane according to Method B. After being subjected to chromatography on silica the product was recrystallised from methanol to give the title methyl ester, m.p. 214–217° (decomp.), $[\alpha]_D$ +60.3° (c 0.97, dioxan), $\lambda_{max.}$ 237 nm. (ε 15,700). (Found: C, 64.5; H, 7.2; Cl, 7.5. $C_{25}H_{33}ClO_6$ requires C, 64.6; H, 7.15; Cl, 7.6%.)

EXAMPLE 57

11β,17α-Dihydroxy-16β-methyl-3-oxoandrosta-1,4-diene-17β-carboxylic acid

A solution of 11β,17α,21-trihydroxy-16β-methylpregna-1,4-diene-3,20-dione (640 mg.) in dioxan (28 ml.) was stirred and treated with a solution of periodic acid (1.76 g.) in water (14 ml.). After 40 minutes the solution was diluted with water (14 ml.) and concentrated in vacuo. The crystalline product (579 mg.) was recrystallised from acetone to give the title acid, m.p. 226–229° (decomp.), $[\alpha]_D$ +78.0° (c 0.50, dimethylsulphoxide), $\lambda_{max}$ 242 nm. (ε 14,850). (Found: C, 70.1; H, 8.0. $C_{21}H_{28}O_5$ requires C, 70.0; H, 7.8%.)

EXAMPLE 58

11β-Hydroxy-16β-methyl-3-oxo-17α-propionyloxy-androsta-1,4-diene-17β-carboxylic acid Treatment of 11β,17α-dihydroxy-16β-methyl-3-oxo-androsta-1,4-diene-17β-carboxylic acid (310 mg.) with propionyl chloride (0.269 ml.) followed by solvolysis of the resulting product with diethylamine by the method described in Example 55 afforded crystalline 11β-hydroxy-16β-methyl-3-oxo-17α-propionyloxyandrosta-1,4-diene-17β-carboxylic acid, m.p. 202–205° (decomp.), $[\alpha]_D$ +24.4° (c 0.97, dioxan), $\lambda_{max.}$ 242.5 nm. (ε 14,820).

EXAMPLE 59

Methyl 11β-hydroxy-16β-methyl-3-oxo-17α-propionyloxy-androsta-1,4-diene-17β-carboxylate A suspension of 11β-hydroxy-16β-methyl-3-oxo-17α-propionyloxyandrosta-1,4-diene-17β-carboxylic acid (250 mg.) in acetone (10 ml.) was cooled to 0° and treated with an ethereal solution of diazomethane according to Method B. After being subjected to preparative thin-layer chromatography on silica the product was crystallised from methanol to give the title methyl ester, m.p. 223–226°, $[\alpha]_D$ +45.4° (c 0.98, dioxan), $\lambda_{max.}$ 242 nm. (ε 14,820). (Found: C, 69.4; H, 7.9. $C_{25}H_{34}O_6$ requires C, 69.7; H, 8.0%.)

EXAMPLE 60 t-Butyl 9α-fluoro-11β-hydroxy-16β-methyl-3-oxo-17α-propionyloxyandrosta-1,4-diene-17β-carboxylate A suspension of 9α-fluoro-11β-hydroxy-16β-methyl-3-oxo-17α-propionyloxyandrosta-1,4-diene-17β carboxylic acid (400 mg.) in ethyl acetate (5 ml.) was treated with O-t-butyl-N,N'-dicyclohexylisourea (1.14 g.) and the mixture was refluxed for 10¼ hours. 2N-Hydrochloric acid was added and the mixture was stirred thoroughly; solid material was removed and washed thoroughly with ethyl acetate and water. The combined ethyl acetate solutions were washed with saturated sodium bicarbonate solution, and water, dried over magnesium sulphate and solvent was removed in vacuo. The resulting product (398 mg.) was purified by chromatography on silica and crystallised first from acetone-petrol then from methanol to give the title t-butyl ester, m.p. 200–207°, $[\alpha]_D$ +35.2° (c 0.95, dioxan), $\lambda_{max.}$ 238–238.5 nm. (ε 14,600). (Found: C, 68.8; H, 8.1. $C_{28}H_{39}FO_6$ requires C, 68.55; H, 8.0%.)

EXAMPLE 61

11β,17α-Dihydroxy-3-oxo-androst-4-ene-17β-carboxylic acid

Reaction of 11β,17α,21-trihydroxypregn-4-ene-3,20-dione (5.0 g.) with periodic acid according to Method A gave a crude product which was partitioned between ethyl acetate and saturated sodium bicarbonate. The aqueous phase was sepaarted and acidified with dilute sulphuric acid and the resulting precipitate was collected, washed with water and dried in vacuo; recrystallisation from methanol gave the title acid, m.p. 235–239° (decomp.), $[\alpha]_D$ +123.5° (c 0.57, dioxan), $\lambda_{max.}$ 241.5 nm. (ε 15,650). (Found: C, 68.4; H, 7.8. $C_{20}H_{28}O_5$ requires C, 68.9; H, 8.1%.)

EXAMPLE 62

17α-Butyryloxy-11β-hydroxy-3-oxoandrost-4-ene-17β-carboxylic acid

11β,17α-Dihydroxy-3-oxoandrost-4-ene-17β-carboxylic acid (1.5 g.) was treated with n-butyryl chloride (3.0 ml.) and the product was solvolysed with diethylamine by the method described in Example 55 to give, after recrystallisation from methanol, 17α-butyryloxy-11β-hydroxy-3-oxoandrost-4-ene-17β-carboxylic acid, m.p. 222–223° (decomp.), $[\alpha]_D$ +45.1° (c 0.98, dioxan), $\lambda_{max.}$ 240 nm. (ε 16,300). (Found: C, 68.3; H, 8.2. $C_{24}H_{34}O_6$ requires C, 68.9; H, 8.2%.)

EXAMPLE 63

Methyl 17α-butyryloxy-11β-hydroxy-3-oxoandrost-4-ene-17β-carboxylate

Treatment of 17α-butyryloxy-11β-hydroxy-3-oxoandrost-4-ene-17β-carboxylic acid (400 mg.) in methanol (40 ml.) with ethereal diazomethane according to Method B gave, after recrystallisation from methanol, the little methyl ester, m.p. 162–165°, $[\alpha]_D$ +49.4° (c 0.71, dioxan), $\lambda_{max.}$ 240 nm. (ε 16,550). (Found: C, 69.05; H, 8.3. $C_{25}H_{36}O_6$ requires C, 69.4; H, 8.4%.)

EXAMPLE 64

11β-Hydroxy-3-oxo-17α-propionyloxyandrost-4-ene-17β-carboxylic acid

Treatment of 11β,17α-dihydroxy-3-oxoandrost-4-ene-17β-carboxylic acid (3.0 g.) with propionyl chloride (2.7 ml.) and solvoylsis of the product with diethylamine (3.25 ml.) by the method described in Example 55 afforded, after recrystallisation from acetone-petrol, 11β-hydroxy-3-oxo-17α-propionyloxyandrost-4-ene-17β-carboxylic acid, m.p. 225–226° (decomp.), $[\alpha]_D$ +46.2° (c 0.98, dioxan), $\lambda_{max.}$ 240.5 nm. (ε 15,500). (Found: C, 67.1; H, 7.8. $C_{23}H_{32}O_6 \cdot \frac{1}{2}H_2O$ requires C, 66.8; H, 7.8%.)

EXAMPLE 65

Methyl 11β-hydroxy-3-oxo-17α-propionyloxyandrost-4-ene-17β-carboxylate

Treatment of 11β-hydroxy-3-oxo-17α-propionyloxyandrost-4-ene-17β-carboxylic acid (2.5 g.) in methanol, (400 ml.) with ethereal diazomethane according to Method B gave a crude product; chromatography of a portion on silica afforded, after recrystallisation from methanol, the title methyl ester, m.p. 176–178°, $[\alpha]_D$ +51.1° (c 0.59, dioxan), $\lambda_{max.}$ 240 nm. (ε 15,800). (Found: C, 68.9; H, 8.3. $C_{24}H_{34}O_6$ requires C, 68.9; H, 8.2%.)

EXAMPLE 66

17α-Acetoxy-11β-hydroxy-3-oxoandrost-4-ene-17β-carboxylic acid

Reaction of 11β,17α-dihydroxy-3-oxoandrost-4-ene-17β-carboxylic acid (3.0 g.) with acetyl chloride (2.2 ml.) and solvolysis of the product with diethylamine (3.0 ml.) by the method described in Example 55 gave, after chromatography on silica and recrystallisation from acetone-petrol, the title 17β-carboxylic acid, m.p. 161–167°, $[\alpha]_D$ +42.8° (c 0.25, dioxan), $\lambda_{max.}$ 241 nm. (ε 14,550). (Found: C, 64.6; H, 7.5. $C_{22}H_{30}O_6$ requires C, 64.7; H, 7.9%.)

EXAMPLE 67

Methyl 17α-acetoxy-11β-hydroxy-3-oxoandrost-4-ene-17β-carboxylate

Reaction of 17α-acetoxy-11β-hydroxy-3-oxoandrost-4-ene-17β-carboxylic acid (2.3 g.) in methanol (368 ml.) with ethereal diazomethane according to Method B gave, after recrystallisation from ethanol, the title methyl ester, m.p. 250–252°, $[\alpha]_D$ =+54.5° (c 0.61, dioxan), $\lambda_{max.}$ 240 nm. (ε 15,350). (Found: C, 67.9; H, 8.0. $C_{23}H_{32}O_6$ requires C, 68.3; H, 8.0%.)

EXAMPLE 68

2'-Acetoxyethyl 9α-fluoro-11β-hydroxy-16β-methyl-3-oxo-17α-propionyloxyandrosta-1,4-diene-17β-carboxylate A solution of 2'-hydroxyethyl 9α-fluoro-11β-hydroxy-16β-methyl-3-oxo-17α-propionyloxyandrosta-1,4-diene-17β-carboxylate (300 mg.) in dry pyridine (6 ml.) was treated with acetic anhydride (0.6 ml.). After being kept at room temperature for 2¾ hours the mixture was poured into well-stirred N-sulphuric acid to give a colourless solid (311 mg.) which was purified by preparative thin-layer chromatography on silica. Two recrystallisations from acetone afforded colourless crystals of the title acetoxyethyl ester, m.p. 156–158°, $[\alpha]_D$ +31.9 (c 0.98, dioxan), $\lambda_{max}$ 237 nm. ($\epsilon$ 15,800). (Found: C, 64.6; H, 7.3. $C_{28}H_{37}FO_8$ requires C, 64.6; H, 7.2%.)

The following examples (a) to (m) illustrate topical formulations prepared in accordance with the invention. In these examples the active ingredient may be any of the active steriods hereinbefore disclosed.

The following examples (a)–(d) illustrate the preparation of ointments.

EXAMPLE (a)

| | Percent w./w. |
|---|---|
| Active ingredient | 0.1 |
| Liquid paraffin B.P. | 10.0 |
| White soft paraffin to produce 100 parts by weight. | |

Ball-mill the steroid with a little of the liquid paraffin until the particle size is reduced to 95% by number below 5µ. Dilute the paste and rinse out the mill with the remaining liquid paraffin, mix and add the suspension to the melted white soft paraffin at 50° C. Stir until cold to give a homogeneous ointment.

EXAMPLE (b)

| | Percent w./w. |
|---|---|
| Active ingredient | 0.25 |
| Aluminium stearate | 3.2 |
| Liquid paraffin B.P. to 100 parts. | |

Disperse the aluminium stearate in the liquid paraffin by vortex stirring and heat the suspension with continued stirring, at a temperature rise rate of 2° C. per minute until 90° C. is reached. Maintain the temperature at 90–95° C. for 30 minutes until solution is complete and a gel is formed. Cool quickly, preferably by the use of cooling coils or concentric cooling rings to produce a transparent solid gel. Mill the active ingredient to produce microfine particles of which not less than 90% by number are below 5µ. Triturate with a small portion of the gel and incorporate the remaining gel to give a homogeneous mix.

EXAMPLE (c)

| | Percent w./w. |
|---|---|
| Active ingredient | 0.1 |
| Woolfat | 12.0 |
| Cetostearyl alcohol B.P.C. | 20.0 |
| Liquid paraffin B.P. | 25.0 |
| White soft paraffin to 100 parts w./w. | |

Ball-mill the steroid with a little of the liquid paraffin as in Example (a) and add the resulting paste, diluted with the remaining liquid paraffin, to a mixture of cetostearyl alcohol, woolfat and white soft paraffin, melted together by gentle warming. Stir until cold to give a homogeneous mix.

EXAMPLE (d)

| | Percent w./w. |
|---|---|
| Active ingredient | 0.05 |
| Hydrogenated lanolin e.g. Lanocerina sold by Croda Ltd. of London W.C. 2, England | 20.0 |
| Liquid paraffin B.P. | 15.0 |
| White soft paraffin to 100 parts w./w. | |

Ball-mill the steroid with liquid paraffin as in Example (a), and add the resulting paste, diluted with the remaining liquid paraffin to the mixture of hydrogenated lanolin and white soft paraffin melted together by gently warming. Stir until cold to give a homogeneous mix.

The following examples (e) and (f) illustrate the preparation of water-miscible creams:

EXAMPLE (e)

| | Percent w./w. |
|---|---|
| Active ingredient | 0.1 |
| Beeswax (White) | 15.0 |
| Cetostearyl alcohol B.P.C. | 7.0 |
| Cetomacrogel 1000 B.P.C. | 3.0 |
| Liquid paraffin B.P. | 5.0 |
| Chlorocresol | 0.1 |
| Distilled water to produce 100 parts by weight. | |

Ball-mill the steroid with a little liquid paraffin as described in Example (a). Heat the available water to 100° C., add the chlorocresol, stir to dissolve and cool to 65° C. Melt together the beeswax, cetostearyl alcohol and cetomacrogel and maintain at 65° C. Add the steroid suspension using the remaining liquid paraffin for rinsing. Add the steroid oil phase at 60° C. to the chlorocresol aqueous phase at 65° C. and stir rapidly while the emulsion cools over the gelling point (40–45° C.). Continue to stir at slow speed until the cream sets.

EXAMPLE (f)

| | Percent w./w. |
|---|---|
| Active ingredient | 0.1 |
| Cetostearyl alcohol B.P.C. | 7.2 |
| Cetomacrogel 1000 B.P.C. | 1.8 |
| Liquid paraffin B.P. | 6.0 |
| White soft paraffin | 15.0 |
| Chlorocresol | 0.1 |
| Distilled water to produce 100 parts by weight. | |

Prepare as described in Example (e), replacing the beeswax with white soft paraffin in the oily phase.

The following examples (g) and (h) illustrate the preparation of lotions:

EXAMPLE (g)

| | Percent w./w. |
|---|---|
| Active ingredient | 0.25 |
| Lanbritol wax [1] | 0.93 |
| Diethylene glycol monostearate | 0.65 |
| Cetostearyl alcohol B.P.C. | 0.65 |
| Liquid paraffin B.P. | 1.95 |
| Glycerin | 5.0 |
| Isopropyl alcohol | 6.5 |
| Methyl p-hydroxy benzoate | 0.15 |
| Distilled water to produce 100 volumes. | |

[1] Lanbritol wax is a non-ionic wax for stablishing emulsions consisting of a mixture of fatty alcohols with polyethylene glycol ethers of fatty alcohols sold by Ronsheim Moore of London W. G. 1, England.

Ball-mill the steroid with half the glycerin, as in Example (a), and use the isopropyl alchol for dilution and rinsing purposes.

Melt together the lanbritol wax, diethylene glycol monostearate, cetostearyl alcohol and liquid paraffin and maintain at 60° C. Heat the available water and remaining glycerin to 95° C. Add the methyl parahydroxy benzoate and stir until dissolved. Cool to 65° C. Add the oily mix at 60° C. to the aqueous phase at 65° C. and allow to cool while stirring rapidly until the emulsion gels at 40–45° C., thereafter stir slowly. Add the well mixed steroid suspension slowly to the lotion base and stir to obtain a homogeneous mix.

EXAMPLE (h)

| | Percent w./v. |
|---|---|
| Active ingredient | 0.05 |
| Tween 80 (polyoxyethylene sorbitan monooleate) | 0.01 |
| Carbopol 934 (carboxy vinyl polymers) | 0.3 |
| Diethanolamine | [1] 0.5 |
| Distilled water to produce 100 volumes. | |

[1] Approximately.

Ball-mill the steroid with a little water and the Tween 80 as in Example (a). Disperse the Carbopol 934 in the available water by vortex stirring. Add the diethanolamine slowly with stirring until the clear thickened mix has a pH of 7.0. Incorporate the steroid slurry into the lotion base and mix well.

EXAMPLE (i)

Aerosol Spray Lotion

| | |
|---|---|
| Active ingredient (microfine) _____mgm__ | 2.5 |
| Fractionated coconut oil to 1.20 g. | |
| Dichlorodifluoromethane _____g__ | 16.32 |
| Trichlorofluoromethane _____g__ | 24.48 |

Dry the steroid overnight at 60° C. under vacuum and over phosphorus pentoxide. Ball-mix the dried powder for at least 4 hours with a little of the dried filtered oil. Rinse out the mill with more dried filtered oil and pass the suspension through a 325 mesh B.S. sieve. Assay the suspension and dilute with more dried filtered oil to the required concentration. Incorporate the suspension into the pressure container with the propellants in a conventional manner.

EXAMPLE (j)

Aphthous Ulcer Pellets

| | Mg. |
|---|---|
| Active ingredient (microfine) _____ | 0.25 |
| Lactose _____ | 69.90 |
| Acacia _____ | 3.00 |
| Magnesium stearate _____ | 0.75 |

Pass the steroid, lactose and acacia, separately through a No. 60 B.S. mesh sieve. Blend the powders and granulate with 50% ethanol in water. Pass the mass through a No. 12 mesh sieve and dry the granules at 50° C. Pass the dried granules through a No. 20 mesh B.S. sieve and blend in the magnesium stearate, previously passed through a No. 100 mesh B.S. sieve. Compress in a conventional manner on 7/32 inch diameter punches, to give a pellet that will dissolve slowly in the mouth.

EXAMPLE (k)

Retention Enema

| | |
|---|---|
| Active ingredient (microfine) ____percent w./v__ | 0.0005 |
| Tween 80 _____do__ | 0.05 |
| Ethanol _____percent v./v__ | 0.015 |
| Methyl p-hydroxy benzoate _____percent w./v__ | 0.08 |
| Propyl p-hydroxy benzoate _____do__ | 0.02 |
| Distilled water to 100 vols. | |

Heat the available water to 95° C., add the methyl and propyl p-hydroxy benzoates and stir to dissolve. Cool the vehicle to room temperature. Disperse the steroid in the ethanol and add to the Tween 80; warm the mixture to 50° C. and stir until the steroid is in solution. Add the steroid solution to the vehicle, stirring vigorously to avoid precipitation, and make up to volume with water if required. Distribute the enema into plastic bags e.g. P.V.C. bags for self-administration or into other containers suitable for use.

EXAMPLE (l)

Eye Drops

| | |
|---|---|
| Active ingredient _____percent w./v__ | 0.025 |
| Tween 80 _____do__ | 2.5 |
| Ethanol _____do__ | 0.75 |
| Benzalkonium chloride _____do__ | 0.02 |
| Phenyl ethanol _____percent v./v__ | 0.25 |
| Sodium chloride _____percent w./v__ | 0.60 |
| Water for injection to 100 volumes. | |

Dissolve the sodium chloride, benzalkonium chloride and phenyl ethanol in the water for injection. Suspend the steroid in the alcohol and add to the Tween 80. Warm the mixture to 50° C. and stir until dissolved. Add the steroid solution to the eye-drop vehicle with rapid stirring to obtain a clear solution. Sterilise the bulk by filtration through a sintered glass filter and distribute into sterile small well filled, neutral glass eye-drop containers.

EXAMPLE (m)

Nasal Drops

| | |
|---|---|
| Active ingredient _____percent w./v__ | 0.005 |
| Tween 80 _____do__ | 0.05 |
| Alcohol 95% _____percent v./v__ | 0.15 |
| Methyl paraben (p-hydroxy benzoate) _____percent w./v__ | 0.04 |
| Propyl paraben (p-hydroxy benzoate) _____do__ | 0.02 |
| Sodium chloride _____do__ | 0.70 |
| Distilled water to 100 volumes. | |

Dissolve the sodium chloride and the parabens in the distilled water heated to 95° C., and allow the solution to cool. Disperse the steroid in the alcohol and add to the Tween 80. Warm the mixture to 50° C. and stir until solution of the steroid is effected. Add the steroid solution to the vehicle with rapid stirring to obtain a clear solution. Filter the solution free from particulate matter through a sintered glass filter and distribute into small, well filled containers.

The following Examples (n) and (o) illustrate formulations for internal administration according to the invention. In both examples the active ingredient used may be any of the active steroid hereinbefore disclosed.

EXAMPLE (n)

Oral Tablet

| | Mg. |
|---|---|
| Active ingredient _____ | 0.5 |
| Lactose _____ | 175.5 |
| Maize starch (dried) _____ | 20.0 |
| Gelatin _____ | 2.0 |
| Magnesium stearate _____ | 2.0 |
| Total weight _____ | 200.0 |

A suspension of 360 mg. of the active ingredient in 2 ml. of water containing 0.1% of Tween 80 was milled for 16 hours in a 10 ml. nylon pot about three quarters filled with steatite balls, until 90% by number of the particles had a diameter of less than 10 microns. The maize starch and lactose were blended and passed through a 60 mesh B.S. sieve and granulated with a 10% solution of gelatin, containing the suspension of the active ingredient and washings from the nylon pot, by passing through a 16 mesh B.S. sieve. The granules were dried at 40° C. overnight, passed through a 20 mesh B.S. sieve and blended with magnesium stearate and tabletted using a tabletting machine having a 5/32 inch flat-bevelled punch.

EXAMPLE (o)

Intra-Articular Injection (a) Preparation of small particle active ingredient.— 2.8 g. Tween 80 was dissolved in 130 ml. of dimethyl acetamide (DMA). 12 g. of the active ingredient was then dissolved in 130 ml. of this solution and the resulting solution was filtered successively through two dry sintered glass filters (No. 3 and No. 4).

The solution of active ingredient was then added, under aseptic conditions, in a fine stream to a stirred sterile aqueous solution of benzyl alcohol (10 g. in 1 litre water) over a period of ten minutes. The preparation was allowed to stand for at least three hours and the resulting crystals collected by filtration or centrifuging. The preparation was washed with aqueous benzyl alcohol (10 g. in 1 litre water) and the wet-cake transferred to a well-sealed container. 90% by number of the particles had a diameter less than $10\mu$ and none were above $50\mu$ in diameter.

(b) Production of injectable preparation:

| Composition: | Percent w./v. |
|---|---|
| Fine particle ingredient prepared as in (a) | 0.50 |
| Hydroxyethyl cellulose | 0.40 |
| Benzyl alcohol | 1.00 |
| Sodium citrate | 0.30 |
| Sodium salt of EDTA[1] | 0.01 |
| Sodium chloride | 0.44 |
| Citric acid, q.s. | |
| Water for injection to 100.0 | |
| pH value 4.80 to 5.50. | |

[1] EDTA is ethylene diamine tetracetic acid.

(1) Vehicle.—The hydroxyethyl cellulose was dissolved in 17.5 litres of water for injection using a high speed vortex stirrer. The benzyl alcohol was added with stirring. The sodium chloride, sodium citrate salt of EDTA were dissolved in 1 litre of water and added to the bulk vehicle with stirring. The pH value of the bulk vehicle was adjusted to 4.80 to 5.50 with a solution of citric acid. The volume was then adjusted to 19.3 litres and the vehicle clarified by filtration through nylon. The vehicle was finally sterilised by autoclaving.

(2) Sterile wet-cake of small particle active ingredient prepared as in (a) containing 100 g. of the active ingredient was added with stirring and under aseptic condtions to 19 litres of the vehcle, and the volume made up to 20 litres.

The resulting suspension was passed through a sterile 100 mesh British Standard sieve and stored in a sealed container. Dosage units for injection were prepared by aseptically filling neutral glass ampoules or vials closed by a pure latex plug.

What is claimed is:

1. A compound of the formula

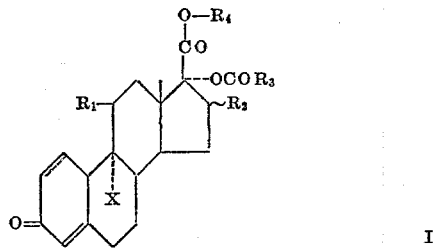

I wherein
(a) X represents a hydrogen, chlorine or fluorine atom; $R_1$ represents β-hydroxy or when X represents a chlorine atom, β-chloro; $R_2$ represents a hydrogen atom, methylene or methyl; $R_3$ represents alkyl of 1 to 3 carbon atoms or phenyl, or when $R_2$ is methylene or methyl, a hydrogen atom; $R_4$ represents lower alkyl; lower alkyl substituted by at least one halogen atom or lower alkoxycarbonyl; or ($C_{2-4}$) alkyl substituted by lower acyloxy; and = represents a single or double bond; or
(b) X represents a chlorine or fluorine atom; $R_1$ represents oxo; $R_2$ represents a hydrogen atom, methylene or methyl; $R_3$ represents methyl or ethyl; $R_4$ represents lower alkyl; lower alkyl substituted by at least one halogen atom or lower alkoxycarbonyl; or ($C_{2-4}$) alkyl substituted by lower acyloxy; and = represent a single or double bond.

2. A compound as claimed in claim 1 wherein $R_3$ represents methyl, ethyl, n-propyl or iso-propyl and $R_4$ represents methyl, ethyl or propyl.

3. A compound as claimed in claim 1 wherein $R_3$ represents a hydrogen atom and $R_4$ represents methyl.

4. A compound as claimed in claim 1 wherein $R_4$ represents alkyl of 1 to 4 carbon atoms.

5. A compound as claimed in claim 1 wherein $R_2$ represents β methyl.

6. A compound as claimed in claim 1 wherein X represents a chlorine or fluorine atom, $R_1$ represents β-hydroxy, $R_2$ represents methyl, $R_3$ represents methyl, ethyl or n-propyl, $R_4$ represents methyl and = represents a double bond.

7. A compound as claimed in claim 6 wherein X represents a fluorine atom and $R_2$ represents β methyl.

8. A compound as claimed in claim 1 wherein X represents a fluorine atom, $R_1$ represents oxo, $R_2$ represents β methyl, $R_3$ represents methyl or ethyl, $R_4$ represents methyl and = represents a double bond.

9. A compound as claimed in claim 1 wherein X represents a fluorine or chlorine atom, $R_1$ represents β-hydroxy, $R_2$ represents methylene, $R_3$ represents methyl, ethyl, n-propyl or iso-propyl and $R_4$ represents methyl or ethyl.

10. A compound as claimed in claim 9 wherein X represents a fluorine atom and $R_4$ represents methyl and = represents a double bond.

11. Compounds as claimed in claim 1 wherein = represents a single bond, X represents a fluorine or chlorine atom, $R_1$ represents β-hydroxy, $R_2$ represents methyl, $R_3$ represents methyl, ethyl or n-propyl and $R_4$ represents methyl or ethyl.

12. A compound as claimed in claim 11 wherein X represents a fluorine atom, $R_2$ represents β methyl and $R_4$ represents methyl.

13. A compound as claimed in claim 1 wherein X represents a hydrogen atom, $R_1$ represents β-hydroxy and $R_2$ represents a hydrogen atom or methyl.

14. A compound as claimed in claim 13 wherein $R_2$ represents β methyl.

15. A compound as claimed in claim 13 wherein $R_3$ represents alkyl of 1 to 3 carbon atoms.

16. A compound as claimed in claim 13 wherein $R_4$ represents methyl.

17. A compound as claimed in claim 1 wherein X and $R_1$ represent chlorine atoms, $R_2$ represents methyl, $R_3$ represents methyl or ethyl, $R_4$ represents methyl or ethyl and = represents a double bond.

18. A compound as claimed in claim 1 selected from the group consisting of
methyl 17α-acetoxy-9α-fluoro-11β-hydroxy-16β-methyl-3-oxoandrosta-1,4-diene-17β-carboxylate;
methyl 9α-fluoro-11β-hydroxy-16β-methyl-3-oxo-17α-propionyloxy-androsta-1,4-diene-17β-carboxylate;
methyl 17α-butyryloxy-9α-fluoro-11β-hydroxy-16β-methyl-3-oxoandrosta-1,4-diene-17β-carboxylate;
methyl 17α-acetoxy-9α-fluoro-11β-hydroxy-16α-methyl-3-oxo-androsta-1,4-diene-17β-carboxylate;
methyl 9α-fluoro-11β-hydroxy-16α-methyl-3-oxo-17α-propionyloxy-androsta-1,4-diene-17β-carboxylate;
methyl 17α-butyryloxy-9α-fluoro-11β-hydroxy-16α-methyl-3-oxo-androsta-1,4-diene-17β-carboxylate;
methyl 9α-fluoro-11β-hydroxy-16-methylene-3-oxo-17α-propionyloxy-androsta-1,4-diene-17β-carboxylate;
methyl 9α-fluoro-11β-hydroxy-16β-methyl-3-oxo-17α-propionyloxy-androst-4-ene-17β-carboxylate;
methyl 17α-acetoxy-9α-fluoro-16β-methyl-3,11-dioxo-androsta-1,4-diene-17β-carboxylate;
methyl 9α-chloro-11β-hydroxy-16β-methyl-3-oxo-17α-propionyloxy-androsta-1,4-diene-17β-carboxylate;
ethyl 9α-fluoro-11β-hydroxy-16β-methyl-3-oxo-17α-propionyloxy androsta-1,4-diene-17β-carboxylate;
methyl 17α-acetoxy-9α,11β-dichloro-16α-methyl-3-oxo-androsta-1,4-diene-17β-carboxylate;
methyl 9α-fluoro-11β-hydroxy-17α-isobutyryloxy-16-methylene-3-oxo-androsta-1,4-diene-17β-carboxylate;
ethyl 9α-fluoro-11β-hydroxy-17α-isobutyryloxy-16-methylene-3-oxo-androsta-1,4-diene-17β-carboxylate;
methyl 11β-hydroxy-16β-methyl-3-oxo-17α-propionyloxy-androsta-1,4-diene-17β-carboxylate; and
methyl 11β-hydroxy-3-oxo-17α-propionyloxy-androst-4-ene-17β-carboxylate.

19. The compound of claim 18 which is methyl 17α-acetoxy - 9α - fluoro-11β-hydroxy - 16β - methyl-3-oxo-androsta-1,4-diene-17β-carboxylate.

20. The compound of claim 18, which is methyl 9α-fluoro-11β-hydroxy - 16β - methyl-3-oxo-17α-propionyloxy-androsta-1,4-diene-17β-carboxylate.

21. The compound of claim 18, which is methyl 17α-butyryloxy - 9α - fluoro-11β-hydroxy-16α-methyl-3-oxo-androsta-1,4-diene-17β-carboxylate.

22. The compound of claim 18, which is methyl 11β-hydroxy - 16β - methyl-3-oxo-17α-propionyloxy-androsta-1,4-diene-17β-carboxylate.

23. The compound of claim 18, which is methyl 11β-hydroxy-3-oxo - 17α - propionyloxy-androst-4-ene-17β-carboxylate.

References Cited
UNITED STATES PATENTS

| | | | |
|---|---|---|---|
| 3,579,551 | 5/1971 | Craddock et al. | 260—413 |
| 3,636,010 | 1/1972 | Anner et al. | 260—397.1 |
| 3,560,558 | 2/1971 | Hayakawa et al. | 260—514 |

ELBERT L. ROBERTS, Primary Examiner

U.S. Cl. X.R.

260—397.45; 424—242

PO-1050
(5/69)

UNITED STATES PATENT OFFICE
CERTIFICATE OF CORRECTION

Patent No. 3,828,080      Dated August 6, 1974

Inventor(s) Gordon Hanley Phillipps et al

It is certified that error appears in the above-identified patent and that said Letters Patent are hereby corrected as shown below:

Column 15, line 24, should read --2'-Hydroxyethyl-9$\alpha$-fluoro-11$\beta$-hydroxy-16$\beta$-methyl-3-oxo-17$\alpha$-pro- --.

Column 15, line 62, "on" should read --in--.

Column 16, line 43, "nm." should read --nm ($E^{1\%}_{1cm.}$ 315).--.

Column 16, line 45, should be deleted.

Column 20, Example (g) should read as follows:

Example (g)

| | |
|---|---|
| Active ingredient | 0.25% w/v |
| Lanbritol wax* | 0.93% w/v |
| Diethylene glycol monostearate | 0.65% w/v |
| Cetostearyl alcohol B.P.C. | 0.65% w/v |
| Liquid paraffin B.P. | 1.95% w/v |
| Glycerin | 5.0% w/v |
| Isopropyl alcohol | 6.5% v/v |
| Methyl p-hydroxy benzoate | 0.15% w/v |
| Distilled water to produce | 100 volumes |

PO-1050
(5/69)

UNITED STATES PATENT OFFICE
CERTIFICATE OF CORRECTION

Patent No. 3,828,080      Dated August 6, 1974

Inventor(s)    Gordon Hanley Phillipps et al    Page 2

It is certified that error appears in the above-identified patent and that said Letters Patent are hereby corrected as shown below:

Column 23, the formula between lines 35 and 49 should show a full line and a broken line between the 1- and 2-positions rather than two full lines.

Column 23, lines 51 and 52, should read --$R_1$ represents β-hydroxy or β-chloro, $R_1$ being β-chloro only when X is a chlorine atom--.

Column 23, line 58, " ==== " should read -- === --.

Column 23, line 65, " ==== " should read -- === --.

Column 24, line 4, " ==== " should read -- === --.

Column 24, line 11, " ==== " should read -- === --.

Column 24, line 17, " ==== " should read -- === --.

Column 24, line 19, "Compounds" should read --A compound-- and " ==== " should read -- === --.

Column 24, line 39, " ==== " should read -- === --.

Column 25, line 1, "of claim 18 which is" should be deleted.

Column 25, line 4, "of claim 18, which is" should be deleted.

PO-1050
(5/69)

UNITED STATES PATENT OFFICE
CERTIFICATE OF CORRECTION

Patent No. 3,828,080      Dated August 6, 1974

Inventor(s) Gordon Hanley Phillipps et al    Page 3

It is certified that error appears in the above-identified patent and that said Letters Patent are hereby corrected as shown below:

Column 25, line 7, "of claim 18, which is" should be deleted.

Column 25, line 10, "of claim 18, which is" should be deleted.

Column 25, line 13, "of claim 18, which is" should be deleted.

Signed and sealed this 1st day of July 1975.

(SEAL)
Attest:

RUTH C. MASON
Attesting Officer

C. MARSHALL DANN
Commissioner of Patents
and Trademarks